United States Patent
Yang et al.

(10) Patent No.: US 11,061,905 B2
(45) Date of Patent: Jul. 13, 2021

(54) JOB MANAGEMENT IN DATA PROCESSING SYSTEM

(71) Applicant: INTERNATIONAL BUSINESS MACHINES CORPORATION, Armonk, NY (US)

(72) Inventors: Jingwei Yang, Cambridge, MA (US); Shilpa N. Mahatma, Chappaqua, NY (US); Rachita Chandra, Cambridge, MA (US); Kevin N. Tran, Boston, MA (US); Dennis Wei, White Plains, NY (US); Karthikeyan Natesan Ramamurthy, Culver City, CA (US); Gigi Yuen-Reed, Tampa, FL (US)

(73) Assignee: International Business Machines Corporation, Armonk, NY (US)

(*) Notice: Subject to any disclaimer, the term of this patent is extended or adjusted under 35 U.S.C. 154(b) by 351 days.

(21) Appl. No.: 15/835,824

(22) Filed: Dec. 8, 2017

(65) Prior Publication Data
US 2019/0179943 A1    Jun. 13, 2019

(51) Int. Cl.
*G06F 16/2455* (2019.01)
*G06F 16/25* (2019.01)
*G06F 8/38* (2018.01)
*G06F 9/38* (2018.01)
(Continued)

(52) U.S. Cl.
CPC ......... *G06F 16/24554* (2019.01); *G06F 8/38* (2013.01); *G06F 9/38* (2013.01); *G06F 16/252* (2019.01)

(58) Field of Classification Search
CPC ........ G06F 16/24554; G06F 9/38; G06F 8/38; G06F 16/252; G06F 9/541; G06F 9/5033; G06F 9/46; G06F 16/2455; G06F 16/25; G06F 9/50; G06F 9/54
See application file for complete search history.

(56) References Cited

U.S. PATENT DOCUMENTS

| | | | |
|---|---|---|---|
| 7,117,500 B2 | 10/2006 | Pulsipher et al. | |
| 8,677,320 B2 | 3/2014 | Wilson et al. | |
| 9,298,760 B1* | 3/2016 | Li | G06F 16/2228 |

(Continued)

FOREIGN PATENT DOCUMENTS

| | | |
|---|---|---|
| CN | 111295648 A | 6/2020 |
| DE | 112018005620 T5 | 7/2020 |

(Continued)

OTHER PUBLICATIONS

International Search Report and Written Opinion for International Application No. PCT/IB2018/059692, International Filing Date: Dec. 6, 2018, dated Apr. 17, 2019, 9 pages.

(Continued)

*Primary Examiner* — Aleksandr Kerzhner
*Assistant Examiner* — Maher N Algibhah
(74) *Attorney, Agent, or Firm* — Anthony M. Pallone

(57) ABSTRACT

Modularized data processing systems and methods for its use are provided. Processing a current job can reuse data generated for a previously processed job to the extent the two share parameter configurations. Similarly, outputs of processing modules generated during processing the previously processed job can be used as inputs to processing modules processing a current job, if the two jobs share some parameter configurations.

21 Claims, 8 Drawing Sheets

(51) Int. Cl.
   *G06F 9/50* (2006.01)
   *G06F 9/54* (2006.01)

(56) References Cited

U.S. PATENT DOCUMENTS

| | | | |
|---|---|---|---|
| 9,667,720 | B1 | 5/2017 | Bent et al. |
| 9,721,214 | B1 | 8/2017 | Corrado et al. |
| 2003/0177046 | A1 | 9/2003 | Socha-Leialoha |
| 2014/0108421 | A1* | 4/2014 | Isaacson ............. G06F 16/2255 707/747 |
| 2015/0339547 | A1 | 11/2015 | Nagasaka |
| 2017/0238055 | A1* | 8/2017 | Chang ..................... G06F 3/013 725/19 |
| 2018/0039695 | A1* | 2/2018 | Chalabi ................. G06N 5/022 |
| 2018/0130024 | A1* | 5/2018 | Fang ...................... G06N 20/00 |

FOREIGN PATENT DOCUMENTS

| | | |
|---|---|---|
| EP | 2637111 A1 | 9/2013 |
| GB | 2583608 A | 8/2020 |
| WO | 2019111188 A1 | 6/2019 |

OTHER PUBLICATIONS

Apache Airflow, "Apache Airflow (incubating) Documentation," https://airflow.incubator.apache.org/, Printed on Oct. 12, 2017, pp. 1-6.

Github, "Sacred is a tool to help you configure, organize, log and reproduce experiments developed at IDSIA", IDSIA/sacred, https://github.com/IDSIA/sacred, Printed on Oct. 12, 2017, pp. 1-5.

Moses, "Experiment Management System," Moses—FactoredTraining/EMS, Printed on Oct. 12, 2017, http://www.statmt.org/moses/?n=FactoredTraining.EMS#ntoc1, pp. 1-16.

Neptune, "Build machine learning models," https://neptune.ml/features/, Features of Neptune, Printed on Nov. 16, 2017, pp. 1-1.

Yang, et al., "Job Management in Data Processing System," Application and Drawings, Filed Dec. 6, 2018, 21 Pages, Related JP Patent Application No. 2020-529139.

\* cited by examiner

```
[jingwei@watsonetnx03 db_pkl]$ ls
dfcode2011-01.pkl   dfcode2013-01.pkl   dfcode2015-01.pkl   dfcost2012-07.pkl   dfcost2014-07.pkl   dfpmpm2012-01.pkl   dfpmpm2014-01.pkl
dfcode2011-02.pkl   dfcode2013-02.pkl   dfcode2015-02.pkl   dfcost2012-08.pkl   dfcost2014-08.pkl   dfpmpm2012-02.pkl   dfpmpm2014-02.pkl
dfcode2011-03.pkl   dfcode2013-03.pkl   dfcode2015-03.pkl   dfcost2012-09.pkl   dfcost2014-09.pkl   dfpmpm2012-03.pkl   dfpmpm2014-03.pkl
dfcode2011-04.pkl   dfcode2013-04.pkl   dfcode2015-04.pkl   dfcost2012-10.pkl   dfcost2014-10.pkl   dfpmpm2012-04.pkl   dfpmpm2014-04.pkl
dfcode2011-05.pkl   dfcode2013-05.pkl   dfcode2015-05.pkl   dfcost2012-11.pkl   dfcost2014-11.pkl   dfpmpm2012-05.pkl   dfpmpm2014-05.pkl
dfcode2011-06.pkl   dfcode2013-06.pkl   dfcode2015-06.pkl   dfcost2012-12.pkl   dfcost2014-12.pkl   dfpmpm2012-06.pkl   dfpmpm2014-06.pkl
dfcode2011-07.pkl   dfcode2013-07.pkl   dfcost2011-01.pkl   dfcost2013-01.pkl   dfcost2015-01.pkl   dfpmpm2012-07.pkl   dfpmpm2014-07.pkl
dfcode2011-08.pkl   dfcode2013-08.pkl   dfcost2011-02.pkl   dfcost2013-02.pkl   dfcost2015-02.pkl   dfpmpm2012-08.pkl   dfpmpm2014-08.pkl
dfcode2011-09.pkl   dfcode2013-09.pkl   dfcost2011-03.pkl   dfcost2013-03.pkl   dfcost2015-03.pkl   dfpmpm2012-09.pkl   dfpmpm2014-09.pkl
dfcode2011-10.pkl   dfcode2013-10.pkl   dfcost2011-04.pkl   dfcost2013-04.pkl   dfcost2015-04.pkl   dfpmpm2012-10.pkl   dfpmpm2014-10.pkl
dfcode2011-11.pkl   dfcode2013-11.pkl   dfcost2011-05.pkl   dfcost2013-05.pkl   dfcost2015-05.pkl   dfpmpm2012-11.pkl   dfpmpm2014-11.pkl
dfcode2011-12.pkl   dfcode2013-12.pkl   dfcost2011-06.pkl   dfcost2013-06.pkl   dfcost2015-06.pkl   dfpmpm2012-12.pkl   dfpmpm2014-12.pkl
dfcode2012-01.pkl   dfcode2014-01.pkl   dfcost2011-07.pkl   dfcost2013-07.pkl   dfpmpm2011-01.pkl   dfpmpm2013-01.pkl   dfpmpm2015-01.pkl
dfcode2012-02.pkl   dfcode2014-02.pkl   dfcost2011-08.pkl   dfcost2013-08.pkl   dfpmpm2011-02.pkl   dfpmpm2013-02.pkl   dfpmpm2015-02.pkl
dfcode2012-03.pkl   dfcode2014-03.pkl   dfcost2011-09.pkl   dfcost2013-09.pkl   dfpmpm2011-03.pkl   dfpmpm2013-03.pkl   dfpmpm2015-03.pkl
dfcode2012-04.pkl   dfcode2014-04.pkl   dfcost2011-10.pkl   dfcost2013-10.pkl   dfpmpm2011-04.pkl   dfpmpm2013-04.pkl   dfpmpm2015-04.pkl
dfcode2012-05.pkl   dfcode2014-05.pkl   dfcost2011-11.pkl   dfcost2013-11.pkl   dfpmpm2011-05.pkl   dfpmpm2013-05.pkl   dfpmpm2015-05.pkl
dfcode2012-06.pkl   dfcode2014-06.pkl   dfcost2011-12.pkl   dfcost2013-12.pkl   dfpmpm2011-06.pkl   dfpmpm2013-06.pkl   dfpmpm2015-06.pkl
dfcode2012-07.pkl   dfcode2014-07.pkl   dfcost2012-01.pkl   dfcost2014-01.pkl   dfpmpm2011-07.pkl   dfpmpm2013-07.pkl   uCostCols.pkl
dfcode2012-08.pkl   dfcode2014-08.pkl   dfcost2012-02.pkl   dfcost2014-02.pkl   dfpmpm2011-08.pkl   dfpmpm2013-08.pkl   uPmpmCols.pkl
dfcode2012-09.pkl   dfcode2014-09.pkl   dfcost2012-03.pkl   dfcost2014-03.pkl   dfpmpm2011-09.pkl   dfpmpm2013-09.pkl
dfcode2012-10.pkl   dfcode2014-10.pkl   dfcost2012-04.pkl   dfcost2014-04.pkl   dfpmpm2011-10.pkl   dfpmpm2013-10.pkl
dfcode2012-11.pkl   dfcode2014-11.pkl   dfcost2012-05.pkl   dfcost2014-05.pkl   dfpmpm2011-11.pkl   dfpmpm2013-11.pkl
dfcode2012-12.pkl   dfcode2014-12.pkl   dfcost2012-06.pkl   dfcost2014-06.pkl   dfpmpm2011-12.pkl   dfpmpm2013-12.pkl
```

```
Output API : 2
Date range : 2013-06
Creation time : 2017-08-09 10:18:16.598385253
Pipeline Type: Incremental Training
PullPath: hdfs://localhost:9010/2017-08-09/api2-2011-10-datashard
Type: file
database:
 -host: "192.168.1.1"
 -database_name: "WATSON"
 -schema: "MARKETSCAN"
tables:
 -claims: "claims_table_1m"
 -member: "membership_table_1m
filters:
 -table: 'membership_table_1m'
 -column: 'pharmben_yes'
 -operation: '=='
 -value: 1
 -table: 'membership_table_1m'
 -column: 'prod_type'
 -operation: 'notin'
 -value: ['HMO','POS with Capitation']
```

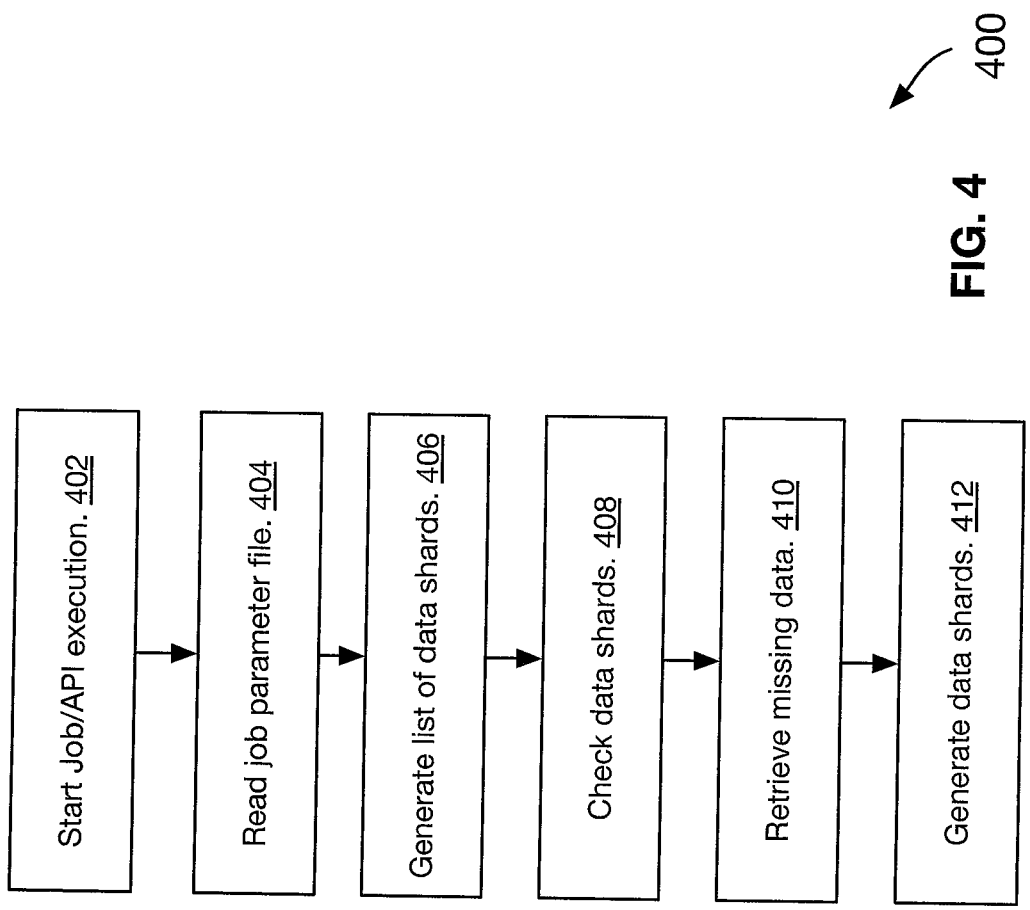

JOB MANAGEMENT IN DATA PROCESSING SYSTEM

BACKGROUND

Embodiments of the invention generally relate to data modeling and machine learning, and more particularly to job management in data processing pipelines for data modeling and machine learning.

A data processing system, such as a predictive data modeling system or a machine learning system, processes one or more jobs. A job refers to a set of data, and a set of parameter configurations, for processing by an application programming interface (API); the API includes a set of programming instructions for processing the job's set of data as governed by the job's parameter configurations, to achieve a data processing objective (for example, generating a data model). The job's parameter configurations may be defined in a parameter file. The set of parameter configurations may be considered a part of or associated with the job. An example of a job's configuration is the particular APIs it requires for execution, the datasets that the API should process, and other processing configurations.

Data scientists often experimentally engage with data processing systems by processing jobs with different configurations and data sets. Based on processing results obtained from differences in parameter configurations, data scientists can derive insights about the data they analyze. For example, a data scientist may experimentally execute many jobs with different parameter configurations to identify data feature sets that impact processing results. Some differences in parameter configurations may have a high impact on results; some may have a low impact; others may have no impact. Using observed variations, data scientists can craft predictive data models, and they can guide machine learning processes for a particular purpose.

SUMMARY

Embodiments of the invention provide for methods, computer program products, and systems for processing a job on a data processing platform. According to an aspect of the invention, the data processing platform receives a first job for processing. The first job has a set of parameter configurations for execution of the first job by a processing pipeline of the data processing platform. The data processing platform executes at least a portion of the first job via one or more processing modules of the processing pipeline. Execution involves using at least one data shard generated during execution of a portion of a second job, and further involves using an output of at least one processing module of the one or more processing modules. The output is generated during execution of a portion of the second job.

According to an aspect of the invention, one or more portions of the second job are processed before executing any portion of the first job.

According to an aspect of the invention, the processing modules include one or more application programming interfaces (APIs).

According to an aspect of the invention, parameter configurations of jobs processed by the data processing system are defined in respective parameter files associated with the jobs.

According to an aspect of the invention, data shards including the at least one data shard generated during execution of a portion of the second job, are managed by a central data service.

According to an aspect of the invention, the central data service is virtualized.

According to an aspect of the invention, the central data service includes a central data repository and a central metadata repository.

According to an aspect of the invention, the central metadata repository includes a set of metadata files for data shards stored in the central data repository, and further includes an additional set of metadata files for outputs of processing modules of the processing pipeline.

According to an aspect of the invention, the data processing system pulls the at least one data shard generated during execution of the portion of the second job from a location indicated in a metadata file for the data shard, and pulls any data not defined by a known data shard from a raw data source.

According to an aspect of the invention, pulling the at least one data shard, and pulling the data not defined by a known data shard, are triggered based on a user selection via a graphical user interface (GUI).

According to an aspect of the invention, a method for processing a job on a data processing platform receives a first job for processing. The first job has a set of parameter configurations for execution of the first job by a processing pipeline of the data processing platform. The processing modules include one or more application programming interfaces (APIs). The method executes at least a portion of the first job via one or more processing modules of the processing pipeline. Executing refers to using at least one data shard generated during execution of a portion of a second job, and using an output of at least one processing module of the one or more processing modules. The output is generated during execution of a portion of the second job, and one or more portions of the second job are processed before executing any portion of the first job. Data shards including the at least one data shard generated during execution of a portion of the second job, are managed by a central data service having a central data repository and a central metadata repository. Executing the at least a portion of the first job further includes pulling the at least one data shard generated during execution of the portion of the second job from a location indicated in a metadata file for the data shard, and pulling any data not defined by a known data shard from a raw data source.

BRIEF DESCRIPTION OF THE SEVERAL VIEWS OF THE DRAWINGS

FIG. 2 provides an example of an organization of the incremental data used by processing system 100 (FIG. 1), according to an embodiment of the invention.

FIG. 3 provides an example of a metadata file for one of the data shards depicted in FIG. 2, according to an embodiment of the invention.

FIG. 4 provides an example of a method 400 for certain functions of data processing system 100 (FIG. 1), according to an embodiment of the invention.

DETAILED DESCRIPTION

Prior art data processing systems, such as a predictive data modeling system or a machine learning system, are limited for several reasons. First, such systems are inefficient in handling streaming and incremental data. Streaming and incremental data refers to a process of data inflow where all the data to be processed is not immediately available. This may be the case, for example, where data is collected somewhat regularly, and it is desirable to process newly available data to improve prior processing results. In other words, the processing performed typically must be incrementally refreshed as new data comes into the system. In the prior art, such systems typically load or "re-pull" data from various data sources and repeat past processing steps on some of the same data. The re-pulling of the data adds to the resource costs and slows processing times. These disadvantages adversely impact online transaction processing (OLTP) business operations.

Second, such systems are not modularized, and therefore are not equipped to re-use partial results from processing modules. In other words, the processing paradigm in the prior art systems is to repeat all processing operations each time new data comes in, without reusing past processing results.

Third, such prior art systems unnecessarily retrain predictive learners where such learners are used. The training does not accommodate incremental training, but instead relies on retraining predictive learner models using entire data sets (old data sets and incrementally new data sets).

Therefore, there is a need for a modularized data processing pipeline management solution that efficiently processes incremental data.

The above limitations in the prior art are examples, and are not intended to be an exhaustive list of prior art limitations. Furthermore, addressing a particular shortcoming of the prior art is not a necessary feature of any given embodiment of the invention. Applicant's invention is defined by the claims.

Aspects of the disclosed invention provide for a modularized processing of jobs in a data processing system. To facilitate discussion of embodiments of the claimed invention, first an overview of the various Figures is provided. Thereafter, each Figure or sets of Figures will be discussed in more detail.

Figure 1:
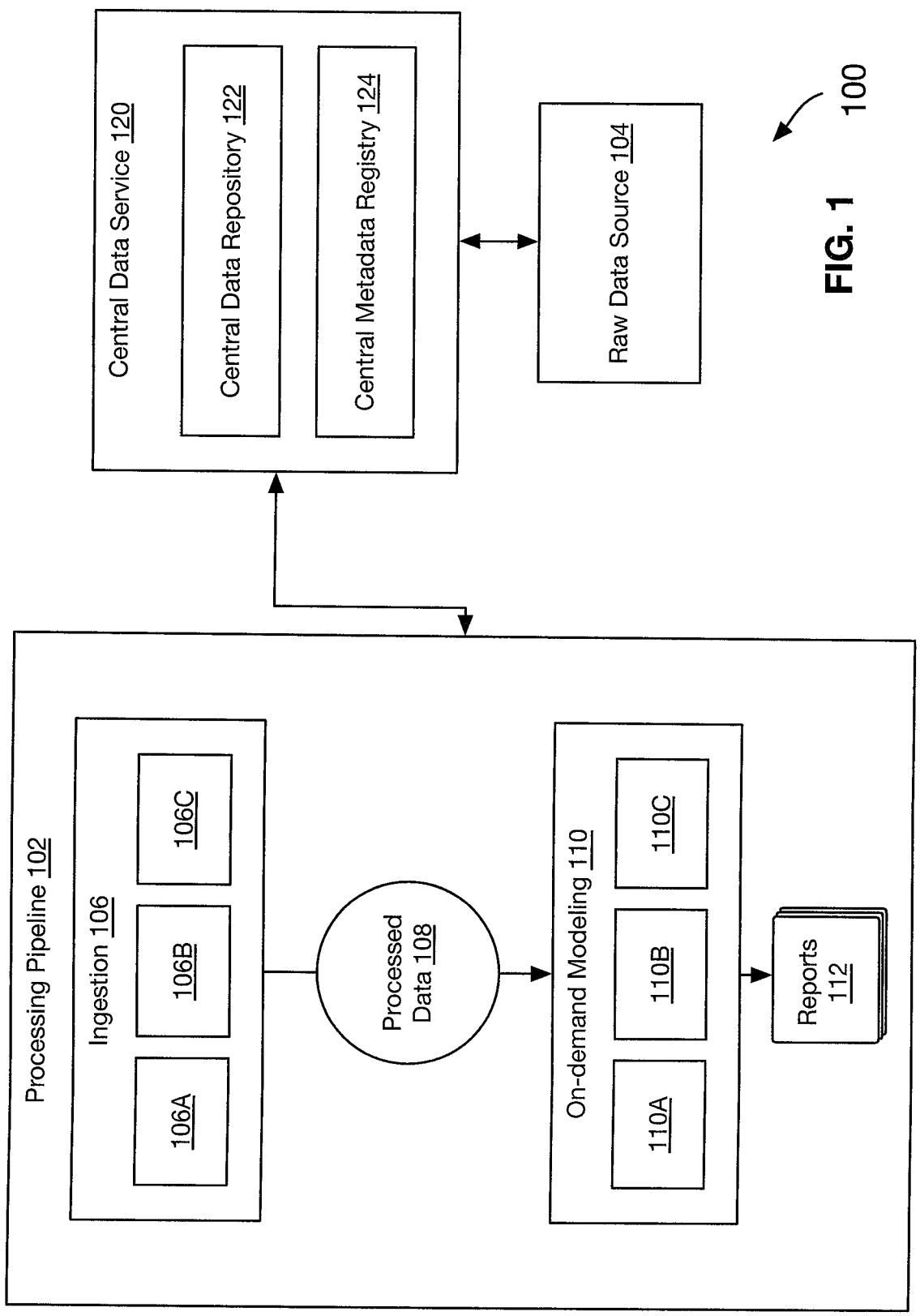
FIG. 1 is a block diagram of a data processing system 100, according to an embodiment of the invention.

For example, FIG. 1 provides an overview of a data processing system 100. Data processing system 100 generally receives jobs for processing. In contrast with prior art systems, data processing system 100 is modularized, and generally enables re-use of incrementally re-pulled data (i.e., data retrieved in increments over previous time increments), and re-use of pipeline module outputs.

FIG. 2 provides an example of an organization of the incremental data used by processing system 100 (FIG. 1). The data in the depicted example is organized into shards according to date.

FIG. 3 provides an example of a metadata file for one of the data shards depicted in FIG. 2.

FIG. 4 provides an example of a method 400 for certain functions of data processing system 100 (FIG. 1).

Figure 5:
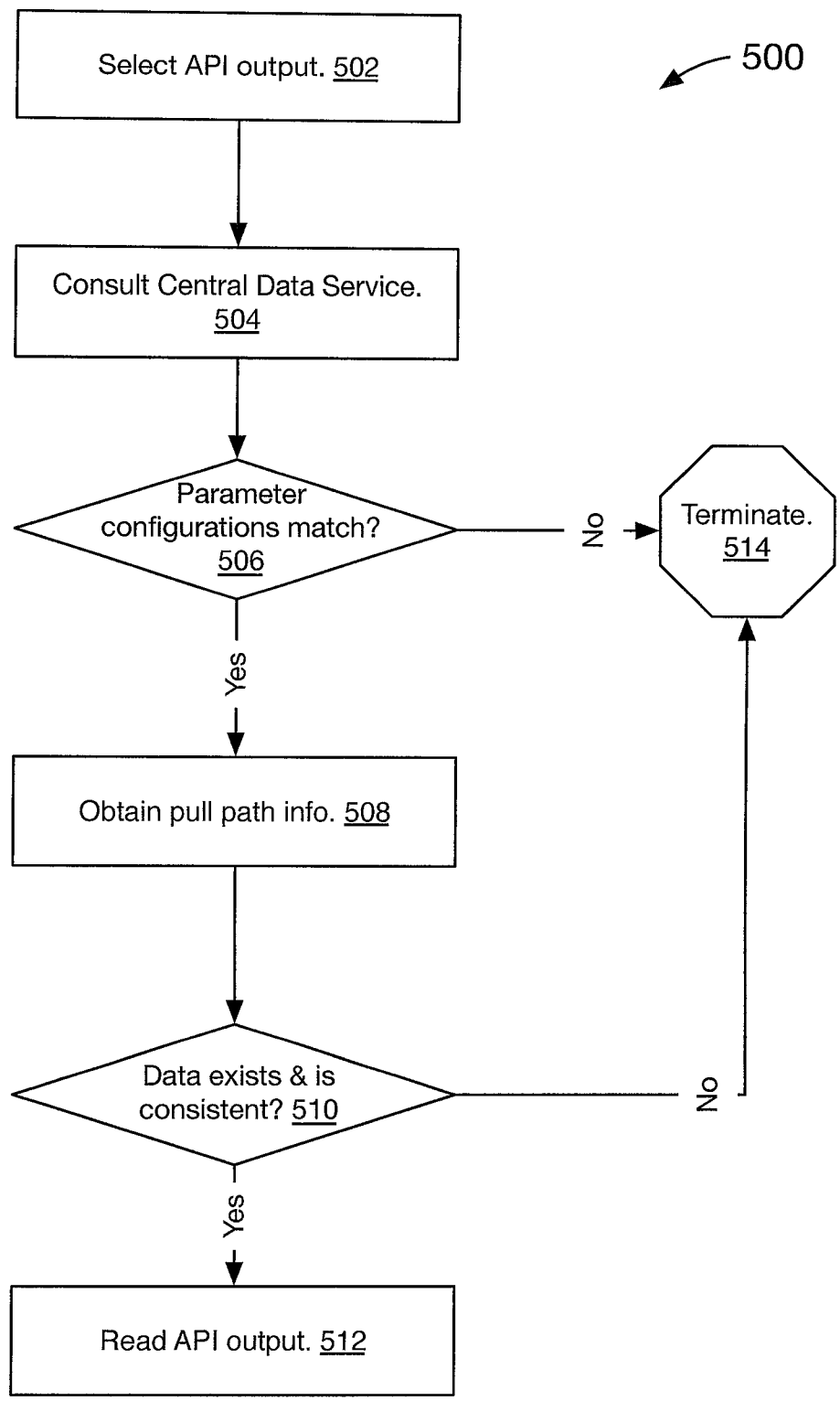
FIG. 5 provides an example of a method 500 for re-using API component outputs across jobs, according to an embodiment of the invention.

FIG. 5 provides an example of a method 500 for re-using API component outputs across jobs.

Figure 6:
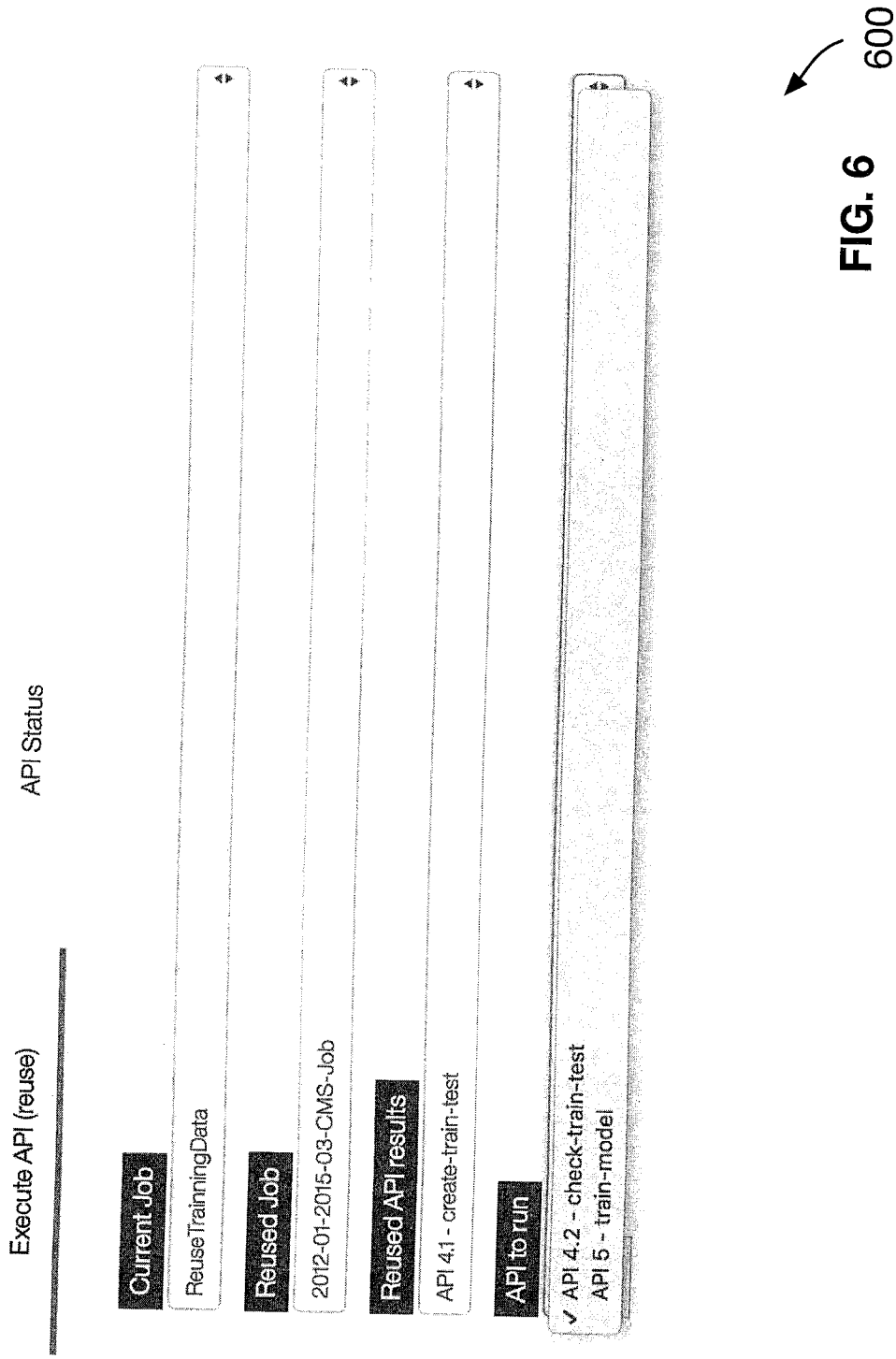
FIG. 6 provides an exemplary graphical user interface (GUI) 600 for reusing data shards and API outputs generated by processing a previous job, according to an embodiment of the invention.

FIG. 6 provides an exemplary graphical user interface (GUI) 600 for reusing data shards and API outputs generated by processing a previous job.

Figure 7:
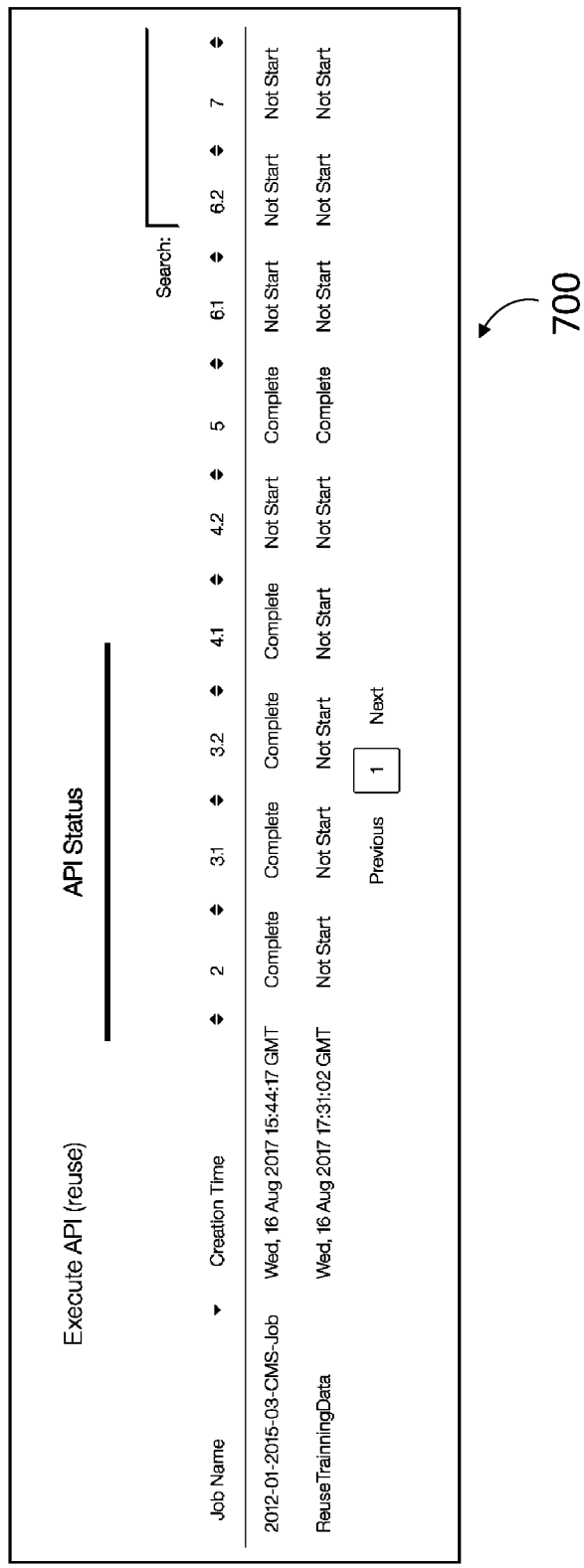
FIG. 7 provides an exemplary GUI 700 for monitoring job statuses, according to an embodiment of the invention.

FIG. 7 provides an exemplary GUI 700 for monitoring job statuses.

Figure 8:
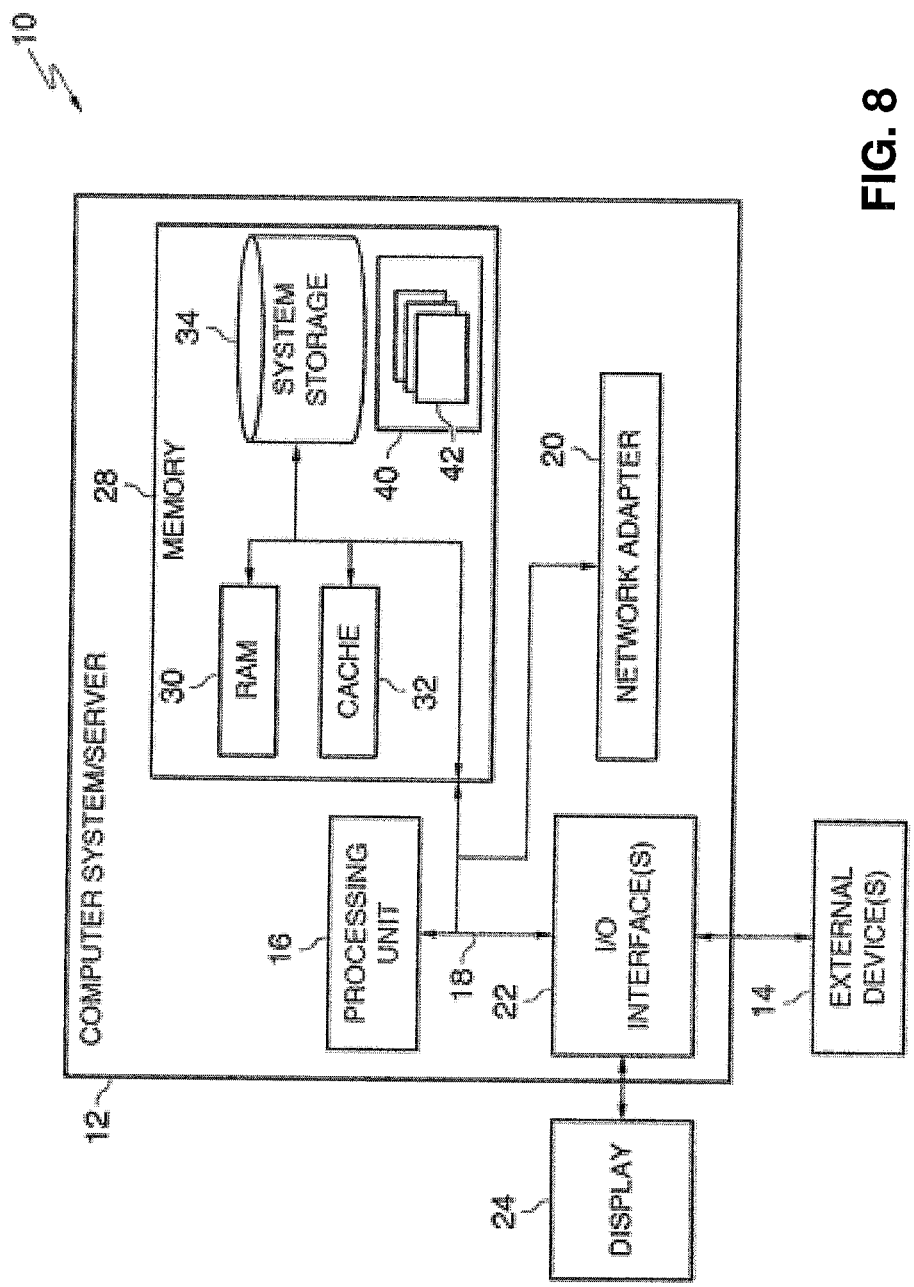
FIG. 8 provides an illustrative computing device for implementing various components of the data processing system of FIG. 1, according to an embodiment of the invention.

FIG. 8 provides an illustrative computing device for implementing various components of the data processing system of FIG. 1.

Referring now to FIG. 1, data processing system 100 is a computing system for processing data, according to an embodiment of the invention. Data processing system 100 may be a single physical device or a collection of physical and virtual computing resources, as described in greater detail in connection with FIG. 13, below.

Data processing system 100 generally includes a data processing pipeline 102, a raw database 104 (also called "original data source"), a central data service 120, and one or more clients 150 (clients represent user devices, used or operated by data scientists to engage with various aspects of data processing system 100). Each of these is discussed in greater detail below.

Data processing pipeline 102 is a processing pipeline for execution of one or more jobs, according to an embodiment of the invention. In the depicted embodiment, data processing pipeline 102 includes two constituent processing pipelines, an ingestion pipeline 106 and an on-demand modelling pipeline 110.

Ingestion pipeline 106 generally receives raw data and metadata from central data service 120, processes the data through one or more processing stages or modules, and outputs the results as processed data 108. The modules in ingestion pipeline 106 include data selection module 106A (for selecting the data to be processed), a validation module 106B (verifying data integrity), an aggregation and feature extraction module 106C (identifies features in the data sets), and a sparse matrices conversion module 106D (for managing sparse matrices).

The on-demand modelling pipeline 110 generally receives processed data 108 from ingestion pipeline 106, and processes the data through one or more processing stages or modules, and outputs one or more reports 112. The modules in on-demand modelling pipeline 110 include generation module 110A for generating training and test data sets from processed data 108, a feature pre-selection module 110B that pre-selects features from the training and test data sets, a model training module 110C that trains data models based on the pre-selected features, and a reporting module 110D that applies the trained model to a particular dataset under analysis to generate one or more reports 112.

With continued reference to FIG. 1, according to the depicted embodiment, data sources in data processing system 100 are logically or physically compartmentalized into raw data source 104 (also called "original data source") and central data service 120. Raw data source 104 is a database storing data that a data scientist (via a client 150) wishes to store, monitor, study, investigate, or otherwise process. The data stored in raw data source 104 is in a somewhat unprocessed form (i.e., it is not necessarily curated for a particular job or a particular processing module); but processed forms of some or all of this raw data may be stored in a database of central data service 120.

Central data service 120 is a physical or virtualized layer (for example, a database) built onto raw data source 104. In contrast with the prior art, clients 150 engage central data service 120 for their data needs in job processing operations, rather than directly engaging raw data source 104. This organization and structure contributes to the novel capability of re-using preprocessed data in a modularized processing pipeline, such as those in data processing system 100.

The functions of central data service 120 are enabled by a central data repository 122 and a central metadata registry 124. Central data repository 122 is a functional component that facilitates access to previously processed data (i.e., raw data from raw data source 104 after it has been processed by one or more processing modules of processing pipeline 102). Data stored in central data repository 122 is organized into data shards. Central data repository 122 may be a physical or virtual database, a Hadoop Distributed File System (HDFS), any other file system, or even a data shards location registry.

The data shards may be organized in a variety of ways, such as by a date and time value (corresponding, for example, to the date and time on which the data shard is generated). For simplicity, in the depicted embodiment, a given data shard is identified with a string ID having the format "YYYY-MM", i.e., a four-digit number representing the year and a two-digit number representing the month in which the given data shard is generated.

Generally, central data service 120 "pulls" raw data from raw data source 104 as needed, i.e., when the data does not exist as a data shard in central data repository 124. This function enables data processing system 100 to avoid "re-pulling" and reprocessing raw data that already has been pulled and processed by processing pipeline modules. These and other features of embodiments of the disclosed invention are made clearer in the following discussion.

With continued reference to FIG. 1, the disclosed configuration of data processing system 100 and its various components enables two types of data re-use, in contrast with the prior art: re-use of pulled incremental data, and re-use of module outputs. Before providing details in connection with illustrative examples provided in the various other Figures, a brief summary is provided here.

With respect to the re-use of incrementally pulled data; data processing system 100 pulls raw data as needed by processing pipeline 102 modules, organizes the pulled data into data shards, and generated metadata files for the data shards. When a processing pipeline 102 module requires some data, data processing system 100 checks (e.g., central data service 120 checks the metadata files for the various data shards) whether the data already exists as a data shard. Rather than re-pulling the data, data processing system 100 simply provides the module with a pointer (e.g., a pull-path) to the relevant data shards. Any data that does not already exist in a data shard on central data repository 122 is pulled from raw data source 104 (corresponding data shards and metadata files are then generated for the pulled data).

With respect to the re-use of and re-use of module outputs; consider two jobs: Job A, and Job B, submitted to data processing system 100 for processing using modules or APIs 1-7. Assume, in this example, that the two jobs have the same parameter configurations for APIs 1-4, but different parameter configurations for the rest of the APIs. Further assume that Job A has been fully processed. Client 150 (a data scientist, or more generally, a user) can engage data processing system 100 to process Job B by reusing the outputs of APIs 1-4 as generated during processing of Job A; and beginning new processing of Job B with API 5. Data processing system 100 can detect API and job topologies and dependencies to determine which modules can use which outputs of previously processed jobs and modules. In making these determinations, data processing system 100 can use the metadata files for each data shard to determine what job or module generated it, and what other jobs or modules can use them.

Referring now to FIG. 2, an example 200 is provided, according to an embodiment, of an organization of the incremental data (i.e., raw data pulled incrementally and used by various processing pipelines 102) used by processing system 100 (FIG. 1). The data in the depicted example is organized into shards according to date. The data is displayed as a list of packing list files (".pkl"), where each file name includes a module name (e.g., "dfCode", "dfCost", and "dfpmpm"), followed by a four-digit year and two-digit month identifier.

Referring now to FIG. 3, an example of a metadata file 300 is provided for one of the data shards depicted in FIG. 2; more specifically, the data shard called "dfpmpm2013-06.pkl". The metadata file in FIG. 3 is merely an example of how some information about a given data shared can be tracked. TABLE 1 is an annotated form of the exemplary metadata file of FIG. 3. The metadata file for this data shard describes the data shard, when it was created, where it is stored (e.g., via a pull-path; the data shard need not be re-pulled or copied from where it is stored initially), the processing pipeline type that generated it, and the format of the information the data shard contains. This information can be used by embodiments of the invention to determine whether the data shard's data is suitable for re-use by another module of a processing pipeline.

TABLE 1

| Metadata File Contents | Annotations |
| --- | --- |
| Output API: 2 | the particular API or module that generated the data in this data shard |
| Date range: 2013-06 | the date range of the raw data used to generate this data shard |
| Creation time: 2017-08-09 10:18:16.598385253 | |
| Pipeline Type: Incremental Training | the particular processing pipeline type that generated this data shard |
| PullPath: hdfs://localhost:9010/2017-08-09/api2-2011-10-datashard | the physical or virtualized server/directory where the data shard is available |
| Type: file | |
| database: | information describing the type of database the shard belongs to and the schema it uses; this information can be used to determine if the data shard is reusable for other processing pipelines or their modules |

TABLE 1-continued

| Metadata File Contents | Annotations |
| --- | --- |
| -host: "192.168.1.1"<br>-database_name: "WATSON"<br>-schema: "MARKETSCAN"<br>tables: | information describing the data stored in the data shard; in this example, the data in this data shard includes insurance data such as insurance claims, insurance memberships, etc. |
| -claims: "claims_table_1m"<br>-member: "membership_table_1m<br>filters:<br>-member: "membership_table_1m<br>-column: 'pharmben_yes'<br>-operation: '=='<br>-value: 1<br>-table: 'membership_table_1m'<br>-column: 'prod_type'<br>-operation: 'notin'<br>- value: ['HMO','POS with Capitation'] | information describing filters used to generate the data |

FIG. 4 provides an example of a method 400 for pulling data from raw data source 104 and central data service 120 of data processing system 100 (FIG. 1), according to an embodiment of the invention. The various functions or steps of method 400 are enabled by programming instructions executable by one or more processors of data processing system 100. In the following discussion, each step may be recited as executable by a particular component of data processing system 100; however, this is for illustration only. The steps or functions can be executed in other ways in substantially the same manner to achieve substantially the same results, without departing from the spirit or scope of the invention.

With continued reference to FIG. 4, processing pipeline 102 starts (step 402) execution of a job on a given API (i.e., one of its modules). Starting processing of the job may include detecting a job request.

Processing pipeline 102 receives the job request and its parameter file, and reads (step 404) the parameter file to determine the job's specifications.

Processing pipeline 102 generates (step 406) a list of data shards expected to be used in the processing of the job. Generating the list of data shards expected to be used may be performed in communication with central data service 120. For example, processing pipeline 102 may communicate the job's specifications to central data service 120, specifying the data the job's processing requires for the given API. Central data service 120 searches central metadata registry 124 using the job's parameter configurations. The search may yield no results, or the search may yield one or more matching metadata files (i.e., metadata files corresponding to data shards whose data can be reused for processing the currently pending job). If the search yields no results, the corresponding data is pulled from raw data source 104. However, if the search does yield some results, then the required data is pulled from corresponding data shards. In this manner, the currently-executing API does not need to "re-pull" data, but rather reuses previously pulled data. This is much more efficient, and is possible because the previously pulled data is already curated based on the API's needs. It does not need to be reassembled in preparation for processing.

Accordingly, based on the list of expected data shards generated (step 406), central data service 120 checks (step 408) the existing data shards in its central metadata registry 122, and retrieves (step 410) missing data from raw data source 104, and generates (step 412) corresponding data shards and metadata files for the newly retrieved data, and adds them to central data repository 122 and central metadata registry 124, respectively.

Method 400 thereby provides a mechanism for reusing previously pulled data, and processes newly pulled data so that it can be reused later. Referring back to the example of Job A and Job B; when processing Job B, data processing system 100 begins execution of API 1 for Job B. Data processing system 100 detects that the data shards and parameter configurations for Job B, API 1, are the same as those for Job A, API 1. Data processing system 100 executes steps of method 400 to reuse data shards previously pulled for Job A, so that the data does not need to be "re-pulled". Data processing system 100 repeats execution of some or all steps of method 400 for Job B, APIs 2-4, in the same manner (note that this order of execution is for illustration only; for example, many or all of the steps of the method may be performed at the same time or in different orders for more than one API at a time). At some point, data processing system 100 determines that the parameter configurations for API 5 are different for Job A and Job B. Therefore, data processing system 100 processes Job B using API 5 without relying on pre-pulled data of Job A, but does use such data for processing Job B using APIs 1-4.

FIG. 5 provides an example of a method 500 for reusing API outputs across process jobs on data processing system 100 (FIG. 1), according to an embodiment of the invention. The various functions or steps of method 500 are enabled by programming instructions executable by one or more processors of data processing system 100. In the following discussion, each step may be recited as executable by a particular component of data processing system 100; however, this is for illustration only. The steps or functions can be executed in other ways in substantially the same manner to achieve substantially the same results, without departing from the spirit or scope of the invention.

Referring now to FIGS. 1 and 5, an API output is selected (step 502). The selected API output is an output generated by an API while processing a first job. The selection may be made (manually user or automatically) by processing pipeline 102 in support of one or more APIs processing a second job. Referring back to the example of Job A and Job B, and APIs-17; Job A is processed using APIs 1-7, with each API generating an output based on its processing. Job B arrives at data processing system 100 for processing. Since its parameter configurations are the same as those for Job B with respect to APIs 1-4, the output of API 4 can be reused for Job B. Therefore, the output of API 4 is selected (step 502) for reuse.

Processing pipeline 102 consults (step 504) central data service 120 about the metadata for the API whose output is to be reused. An example of a metadata file generated based on processing a job via an API is provided in TABLE 2. In this example, the APIs whose outputs are recorded in the metadata file are APIs 1-4.

TABLE 2

```
Output API: 4
Date range: 2015-03-2017-06
Creation time: 2017-08-09 10:18:16.598385253
Pipeline Type: Normal
Pull Path: data@192.168.9.9:/home/data/api4-output
Type: directory
API1
API2
...
API3
...
API4
dates:
        train_feature_start: - "2015-03"
feature_creation:
        target: "allow_amount:sum"
        ...
        ...
```

Central data service 120 verifies (decision step 506) whether first job (already processed) and the second job (to be processed) share the same parameter configurations. The verification is performed by interrogating the parameter files of each Job, and the metadata files of the APIs in question (for example, the metadata file in TABLE 2).

If the verification fails (no branch of decision step 510), i.e., if the first job and the second hob don't share the same parameter configurations, then the process terminates (step 514). The termination may include, for example, communicating a message to a client 150 (assuming a manual selection step 502) that the selected API output as generated based on processing the first job cannot be used to process the second job.

If the verification succeeds (yes branch of decision step 506), on the other hand, central data service 120 obtains (step 508) the pull-path (e.g., server address and directory information) for the selected API's output. Processing continues to data existence and consistency verification (decision step 510). If the data does not exist or is not intact (no branch of decision step 510), processing terminates (similar to termination after decision step 506). If the data exists and is intact (yes branch of decision step 510), central data service 120 reads (step 512) the selected APIs' output for the first job (outputted when processing the first job), and begins execution of the next API for the second job using that output.

Upon processing pipeline 120 performing its processing functions for the second job using the next API, it communicates its output to central data service 120 for storing. TABLE 3 provides an example of API 5's output being stored upon executing Job B based on outputs of APIs 1-4 generated upon executing Job A.

TABLE 3

```
Output API: 5
Date range: 2015-03-2017-06
```

TABLE 3-continued

```
Creation time: 2017-08-09 10:18:16.598385253 Pipeline
Type: Incremental Training
Pull Path: data@202.168.9.9:/home/data/api5-output
Type: directory
API1
...
API2
...
API3
...
API4
...
API5
...
```

Referring now to FIG. 6, an exemplary graphical user interface (GUI) 600 for reusing data shards and API outputs generated by processing a previous job are provided. In the depicted example, two jobs are referenced: a "current job" and a "reused job". Elsewhere, these jobs have been referred to as the first job and the second job, or Job A and Job B, depending on the context. "Reused API results", in FIG. 6, refers to the output of (in this case) API 4.1. The GUI 600 provides a client 510 a dropdown menu to select one of two APIs having available outputs: API 4.1 and API 5. Upon beginning execution of the "current job" using these settings, data processing system 100 either processes the "current job" using existing data shards and API outputs, or if the parameter configurations of the "current job" and the "reused job" do not match, terminates the process with a message to client 150 that processing did not succeed or cannot be performed. Embodiments of the invention may provide suggested APIs, suggested data shards, or suggested other jobs, to use instead. In a related embodiment, the suggestions are made at the outset.

Referring now to FIG. 7, an exemplary GUI 700 for monitoring job statuses is provided. A client 150 may use GUI 700 to monitor job statuses to select API outputs of suitable jobs. In the depicted example, two jobs are shown. The first job is associated with APIs 1-7 (some are not shown, and some have sub-APIs), with some of them having been executed for the first job and having associated outputs. The second job is associated with the same APIs, but none of them have been executed with respect to the second job. Assuming that the two depicted job share configuration parameters for APIs 1-4.1 (but not for 4.2), data processing platform 100 can begin processing the second job via API 5 by using outputs of APIS 1-4.1 generated when processing the first job.

Referring now to FIG. 8, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein. Computing device 10 is an example of one or more of the physical and virtual devices of data processing system 100 (FIG. 1).

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now generally to embodiments of the present invention, the embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing a job on a data processing platform, comprising:
    receiving a first job for processing, the first job having a set of parameter configurations for execution of the first job by a processing pipeline of the data processing platform; and
    executing at least a portion of the first job via one or more processing modules of the processing pipeline, the executing comprising using at least one data shard generated during execution of a portion of a second job, and further comprising using an output of at least one processing module of the one or more processing modules, the output being generated during execution of a portion of the second job, wherein executing the at least a portion of the first job further comprises:
        pulling the at least one data shard generated during execution of the portion of the second job from a location indicated in a metadata file for the data shard; and
        pulling any data not defined by a known data shard from a raw data source, wherein pulling the at least one data shard, and pulling the data not defined by a known data shard, are triggered based on a user selection via a graphical user interface (GUI).

2. The method of claim 1, wherein one or more portions of the second job are processed before executing any portion of the first job.

3. The method of claim 1, wherein the processing modules comprise one or more application programming interfaces (APIs).

4. The method of claim 1, wherein parameter configurations of jobs processed by the data processing system are defined in respective parameter files associated with the jobs.

5. The method of claim 1, wherein data shards including the at least one data shard generated during execution of a portion of the second job, are managed by a central data service.

6. The method of claim 5, wherein the central data service is virtualized.

7. The method of claim 5, wherein the central data service comprises a central data repository and a central metadata repository.

8. The method of claim 7, wherein the central metadata repository comprises a set of metadata files for data shards stored in the central data repository, and further comprises an additional set of metadata files for outputs of processing modules of the processing pipeline.

9. A computer program product for processing a job on a data processing platform, the computer program product comprising a non-transitory tangible storage device having program code embodied therewith, the program code executable by a processor of a computer to perform a method, the method comprising:
receiving, by the processor, a first job for processing, the first job having a set of parameter configurations for execution of the first job by a processing pipeline of the data processing platform; and
executing, by the processor, at least a portion of the first job via one or more processing modules of the processing pipeline, the executing comprising using at least one data shard generated during execution of a portion of a second job, and further comprising using an output of at least one processing module of the one or more processing modules, the output being generated during execution of a portion of the second job, wherein executing the at least a portion of the first job further comprises:
pulling, by the processor, the at least one data shard generated during execution of the portion of the second job from a location indicated in a metadata file for the data shard; and
pulling, by the processor, any data not defined by a known data shard from a raw data source, wherein pulling the at least one data shard, and pulling the data not defined by a known data shard, are triggered based on a user selection via a graphical user interface (GUI).

10. The computer program product of claim 9, wherein one or more portions of the second job are processed before executing any portion of the first job.

11. The computer program product of claim 9, wherein the processing modules comprise one or more application programming interfaces (APIs).

12. The computer program product of claim 9, wherein parameter configurations of jobs processed by the data processing system are defined in respective parameter files associated with the jobs.

13. The computer program product of claim 9, wherein data shards including the at least one data shard generated during execution of a portion of the second job, are managed by a central data service.

14. The computer program product of claim 13, wherein the central data service is virtualized.

15. The computer program product of claim 13, wherein the central data service comprises a central data repository and a central metadata repository.

16. The computer program product of claim 15, wherein the central metadata repository comprises a set of metadata files for data shards stored in the central data repository, and further comprises an additional set of metadata files for outputs of processing modules of the processing pipeline.

17. A computer system for processing a job on a data processing platform, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
receiving a first job for processing, the first job having a set of parameter configurations for execution of the first job by a processing pipeline of the data processing platform; and
executing at least a portion of the first job via one or more processing modules of the processing pipeline, the executing comprising using at least one data shard generated during execution of a portion of a second job, and further comprising using an output of at least one processing module of the one or more processing modules, the output being generated during execution of a portion of the second job, wherein executing the at least a portion of the first job further comprises:
pulling the at least one data shard generated during execution of the portion of the second job from a location indicated in a metadata file for the data shard; and
pulling any data not defined by a known data shard from a raw data source, wherein pulling the at least one data shard, and pulling the data not defined by a known data shard, are triggered based on a user selection via a graphical user interface (GUI).

18. The computer system of claim 17, wherein one or more portions of the second job are processed before executing any portion of the first job.

19. The computer system of claim 17, wherein the processing modules comprise one or more application programming interfaces (APIs).

20. The computer system of claim 17, wherein the data processing platform comprises a central data service, the central data service comprising a central data repository and a central metadata repository, wherein the central metadata repository comprises a set of metadata files for data shards stored in the central data repository, and further comprises an additional set of metadata files for outputs of processing modules of the processing pipeline.

21. A method for processing a job on a data processing platform, comprising:
receiving a first job for processing, the first job having a set of parameter configurations for execution of the first job by a processing pipeline of the data processing platform, wherein the processing modules comprise one or more application programming interfaces (APIs); and
executing at least a portion of the first job via one or more processing modules of the processing pipeline, the executing comprising using at least one data shard generated during execution of a portion of a second job, and further comprising using an output of at least one processing module of the one or more processing modules, the output being generated during execution of a portion of the second job, wherein one or more portions of the second job are processed before executing any portion of the first job, wherein data shards including the at least one data shard generated during execution of a portion of the second job, are managed by a central data service comprising a central data repository and a central metadata repository, wherein executing the at least a portion of the first job further comprises:
pulling the at least one data shard generated during execution of the portion of the second job from a location indicated in a metadata file for the data shard; and pulling any data not defined by a known data shard from a raw data source, wherein pulling the at least one data shard, and pulling the data not defined by a known data shard, are triggered based on a user selection via a graphical user interface (GUI).

* * * * *